US012698872B2

(12) United States Patent
Lu et al.

(10) Patent No.: US 12,698,872 B2
(45) **Date of Patent: *Aug. 4, 2026**

(54) LED LIGHTING DEVICE

(71) Applicant: Xiamen PVTECH Co., Ltd., Xiamen (CN)

(72) Inventors: Fuxing Lu, Xiamen (CN); Rongtu Liu, Xiamen (CN); Huibao Luo, Xiamen (CN); Zehu Dai, Xiamen (CN); Liangliang Cao, Xiamen (CN); Chun Ming Liu, Xiamen (CN); Dejia Li, Xiamen (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/248,484

(22) Filed: Jun. 25, 2025

(65) Prior Publication Data

US 2025/0320973 A1 Oct. 16, 2025

Related U.S. Application Data

(63) Continuation-in-part of application No. 18/916,716, filed on Oct. 16, 2024, now Pat. No. 12,366,346, (Continued)

(51) Int. Cl.

*F21K 9/278* (2016.01)
*F21K 9/66* (2016.01)
(Continued)

(52) U.S. Cl.
CPC ................ *F21K 9/278* (2016.08); *F21K 9/66* (2016.08); *F21K 9/68* (2016.08); *F21S 4/28* (2016.01);
(Continued)

(58) Field of Classification Search
CPC ............ F21K 9/27–278; F21S 4/20–28; F21V 19/001–0095; F21V 23/02–06;
(Continued)

(56) References Cited

U.S. PATENT DOCUMENTS 8,192,054 B2 6/2012 Grajcar
10,731,805 B2 * 8/2020 Li ............................ F21S 4/24
(Continued)

*Primary Examiner* — Jason M Han
(74) *Attorney, Agent, or Firm* — Bruce Stone LLP; Joseph A. Bruce

(57) ABSTRACT

A LED lighting device includes a power supplier, a light cover and a circuit board. The circuit board is disposed in the light cover. The circuit board has a protective layer disposed thereon and a plurality of light sources. The circuit board has a front soldering section, a rear soldering section and a circuit section. The circuit board includes a left-wing portion, a right-wing portion, and a flat portion disposed therebetween and not parallel thereto, such that the circuit board is bent. The light sources are disposed on the circuit section and electrically connected to the circuit section. The protective layer includes an opening and two coated layers. The opening includes a front section, a rear section and a connecting section. The coated layers are disposed on the two sides of the connecting section respectively. The light sources are within the connecting section.

15 Claims, 12 Drawing Sheets

Related U.S. Application Data which is a continuation-in-part of application No. 18/138,146, filed on Apr. 24, 2023, now Pat. No. 12,146,621.

(51) Int. Cl.

| | |
|---|---|
| ***F21K 9/68*** | (2016.01) |
| ***F21S 4/28*** | (2016.01) |
| ***F21V 17/04*** | (2006.01) |
| ***F21V 23/02*** | (2006.01) |
| ***F21Y 103/10*** | (2016.01) |
| ***F21Y 115/10*** | (2016.01) |

(52) U.S. Cl.
CPC ............ *F21V 17/04* (2013.01); *F21V 23/023* (2013.01); *F21Y 2103/10* (2016.08); *F21Y 2115/10* (2016.08)

(58) Field of Classification Search
CPC ......... F21V 31/005–04; F21Y 2103/10; F21Y 2115/10
See application file for complete search history.

(56) References Cited

U.S. PATENT DOCUMENTS

| | | | |
|---|---|---|---|
| 11,898,708 | B1 | 2/2024 | Lu |
| 2010/0061089 | A1 | 3/2010 | Lin |
| 2013/0051070 | A1 | 2/2013 | Wu |
| 2015/0043205 | A1 | 2/2015 | Wei |
| 2017/0089521 | A1 | 3/2017 | Jiang |
| 2018/0049318 | A1 | 2/2018 | Maki |

* cited by examiner

LED LIGHTING DEVICE

CROSS REFERENCE TO RELATED APPLICATIONS

This application is a continuation-in-part of U.S. application Ser. No. 18/916,716, filed on Oct. 16, 2024, which is a continuation-in-part of U.S. application Ser. No. 18/138,146, filed on Apr. 24, 2023. The contents of these applications are incorporated herein by reference.

BACKGROUND OF THE INVENTION

1. Field of the Invention

The present invention relates to a lighting device, in particular to a LED lighting device.

2. Description of the Prior Art

LED (light-emitting diode) light tubes have many advantages, such as high efficiency, low power consumption, long service life, etc., so LED light tubes have been comprehensively applied to various buildings. However, currently available LED light tubes still have many shortcomings to be overcome.

For example, the circuit board (printed circuit) of a currently available LED light tube has a protective layer (ink) for providing the insulating function and protecting the traces on the circuit board. However, the protective layer usually has a lot of openings and a plurality of LEDs are disposed in these openings respectively (for instance, U.S. Pat. No. 10,670,197 adopts the protective layer having the above design). Therefore, the coating process of the protective layer is very complicated and the halogen elements of the protective layer tend to move to the soldering sections of the circuit board. Accordingly, the soldering sections are prone to be oxidized, and the conductivity and the soldering effect thereof may be influenced during the manufacturing process.

In addition, the currently available LED light tubes do not have a proper optical structure design, so the overall light-emitting areas of these lighting devices are limited can be significantly increased. Therefore, the light efficiency of these LED lighting devices is low.

Further, the circuit board of a currently available LED light tube are typically adhered to the inner surfaces of the light cover thereof via an adhesive material. However, this method tends to generate stress that may damage the circuit board, potentially causing the light tube to malfunction. As a result, the service life of the light tube is also reduced.

On the other hand, traces of the adhesive material can affect the appearance of the light tube, compromising its overall aesthetics and negatively impacting the user experience. Moreover, the adhesive material may also affect the light efficacy of the light tube, resulting in a reduction in the overall performance of the light tube.

SUMMARY OF THE INVENTION

One embodiment of the present invention provides a light-emitting diode (LED) lighting device, which includes a power supplier, a light cover and a circuit board. The circuit board is disposed in the light cover. The circuit board has a protective layer disposed thereon and a plurality of light sources. The circuit board has a front soldering section, a rear soldering section and a circuit section. The front soldering section is electrically connected to the rear soldering section via the circuit section, and the front soldering section and the rear soldering section are electrically connected to the power supplier. The light sources are disposed on the circuit section and electrically connected to the circuit section. The circuit board includes a left-wing portion, a right-wing portion, and a flat portion disposed therebetween. The left-wing portion and the right-wing portion respectively extend from the two sides of the flat portion, and are not parallel to the flat portion, such that the circuit board is bent. The protective layer includes an opening and two coated layers. The opening includes a front section, a rear section and a connecting section. The front section is connected to the rear section via the connecting section, and the coated layers are disposed on the two sides of the connecting section respectively. The light sources are within the connecting section to serve as a light-emitting zone. The light-emitting zone makes the inner space of the light cover form an optical zone, such that the optical zone simultaneously covers the light-emitting zone, the front soldering section and the rear soldering section.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
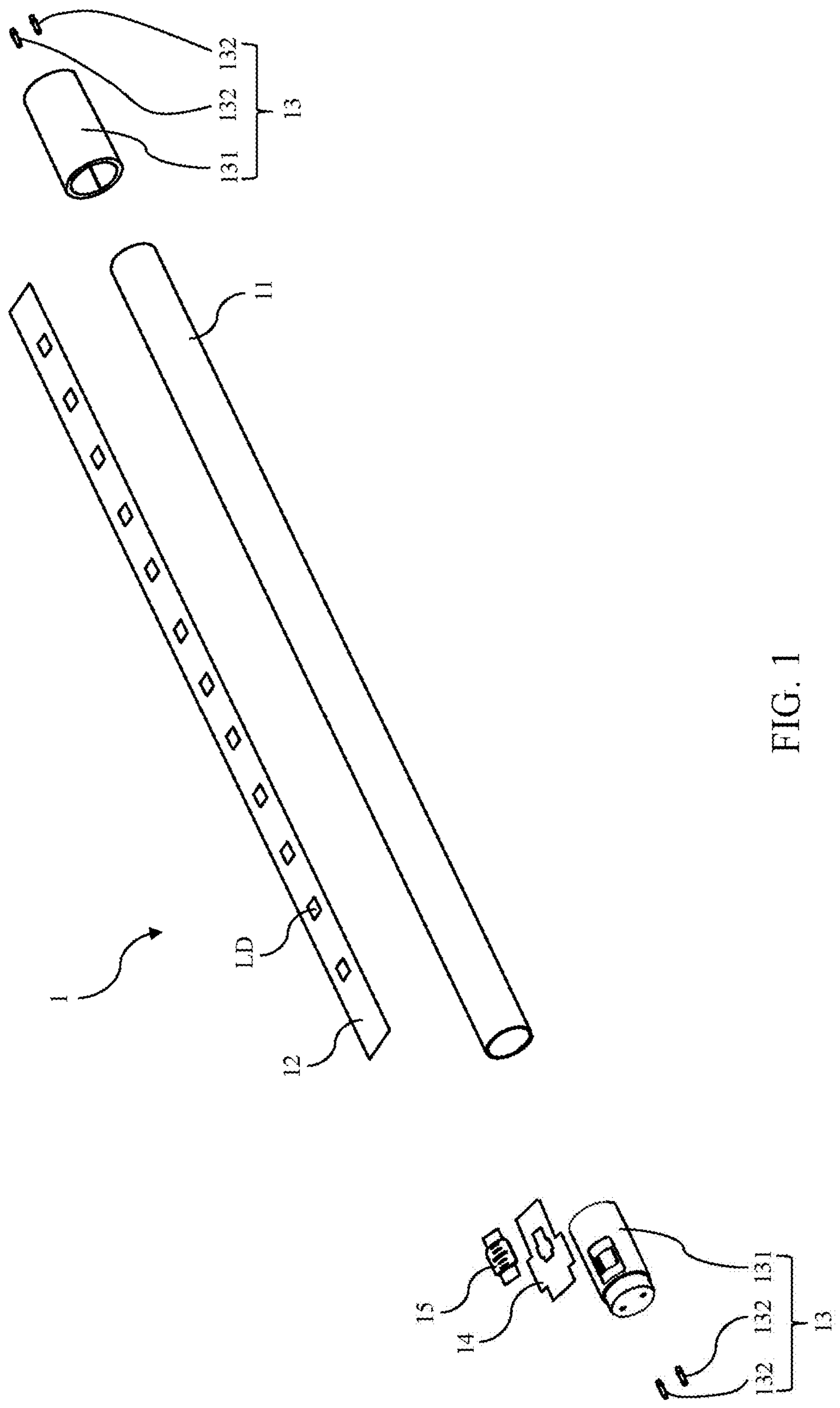
FIG. 1 is an exploded view of a LED lighting device in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
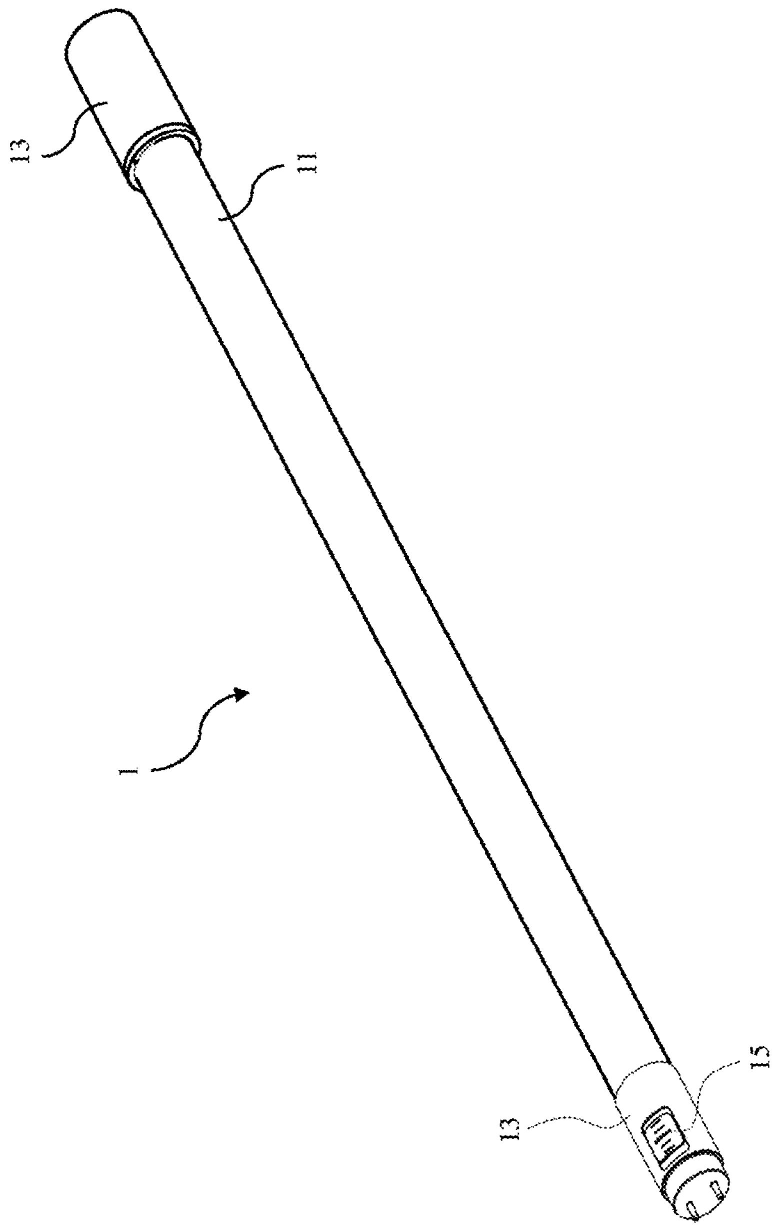
FIG. 2 is a perspective view of the LED lighting device in accordance with one embodiment of the present invention.

Please refer to FIG. 1 and FIG. 2. FIG. 1 is an exploded view of a light-emitting diode (LED) lighting device in accordance with one embodiment of the present invention. FIG. 2 is a perspective view of the LED lighting device in accordance with one embodiment of the present invention. As shown in FIG. 1 and FIG. 2, the LED lighting device 1 includes a light cover 11, a circuit board 12, two end caps 13, a power supplier 14, a color temperature switch 15 and a plurality of light sources LD. In this embodiment, the LED lighting device 1 is a LED light tube. In another embodiment, the LED lighting device 1 may be a LED panel light, LED ceiling light or other currently available lighting devices.

The circuit board 12 is disposed in the light cover 11. In this embodiment, the circuit board 12 is a flexible printed circuit board (FPCB). In another embodiment, the circuit board 12 is a printed circuit board. In this embodiment, the light cover 11 may be tubular. In another embodiment, the light cover 11 may be a flat circular box, a flat rectangular box, etc. In one embodiment, the light cover 11 may be made of a transparent material or a translucent material, such as plastics, glass, etc.

The two end caps 13 are disposed at the two ends of the light cover 12 and the power supplier 14 is disposed in one of the end caps 13 and electrically connected to the circuit board 12. Each of the end caps 13 includes a casing 131 and two metal pins 132 (e.g., copper, iron, aluminum, etc.). The metal pins 132 are disposed on the casing 131 and electrically connected to the power supplier 14 and the circuit board 12. In one embodiment, the power supplier 14 is a LED power supplier, which may include converters, rectifiers, filters and other necessary electronic components; the details of the power supplier 14 are known by those skilled in the art, so will not be described herein.

The light sources LD are disposed on the circuit board 12 and electrically connected to the circuit board 12. In this embodiment, the light sources LD are LEDs. In another embodiment, the light sources LD may be a LED light strip.

The color temperature switch 15 is disposed on one of the end caps 13 and connected to the power supplier 14. The user can operate the color temperature switch 15 to adjust the color temperature of the light sources LD. In another embodiment, the color temperature switch 15 may be replaced by a dimming switch, or the LED lighting device 1 may have both of the color temperature switch 15 and the dimming switch.

The embodiment just exemplifies the present invention and is not intended to limit the scope of the present invention; any equivalent modification and variation according to the spirit of the present invention is to be also included within the scope of the following claims and their equivalents.

Figure 3:
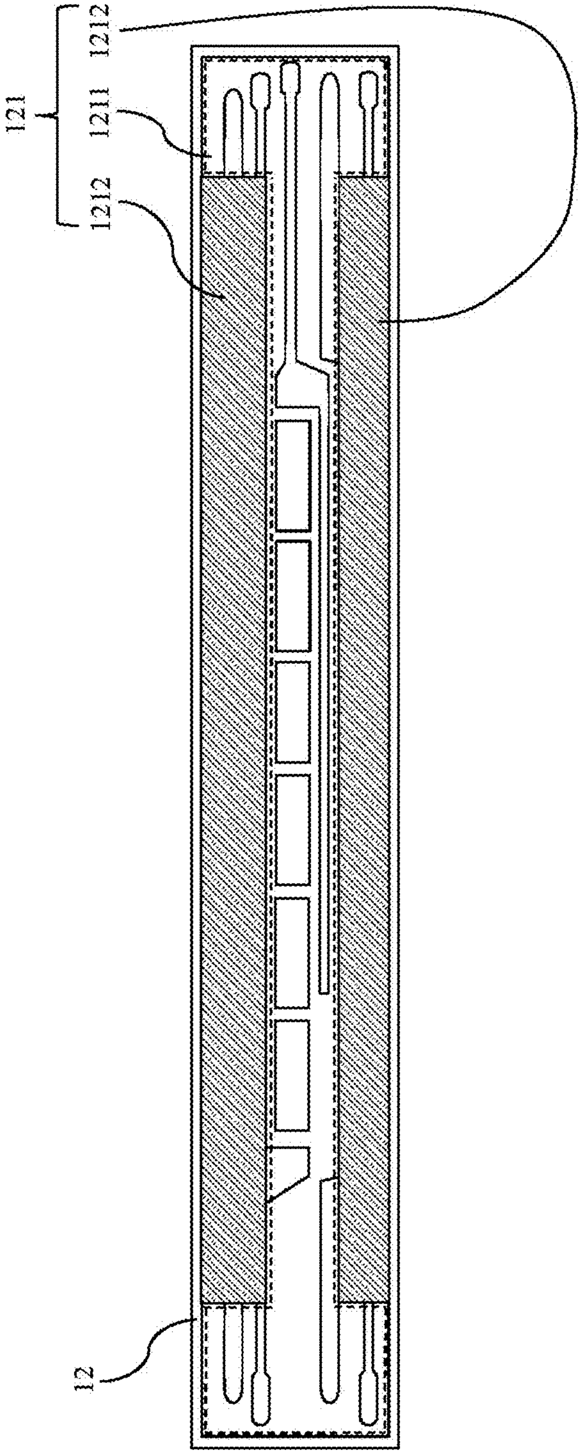
FIG. 3 is a first schematic view of a circuit board of the LED lighting device in accordance with one embodiment of the present invention.
Figure 4:
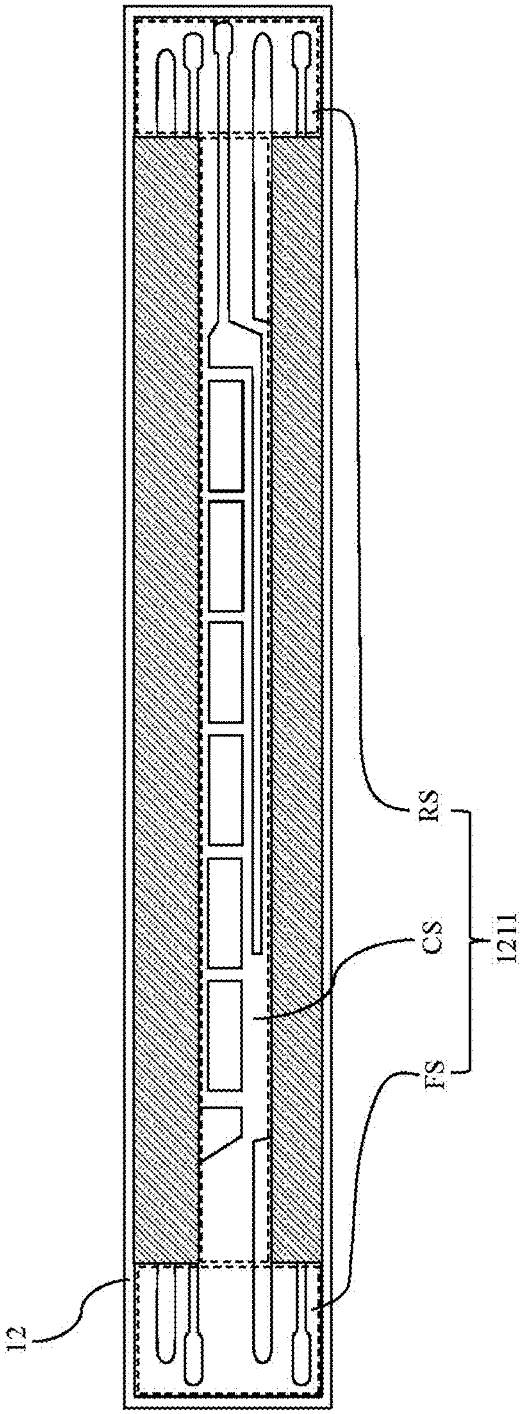
FIG. 4 is a second schematic view of the circuit board of the LED lighting device in accordance with one embodiment of the present invention.

Please refer to FIG. 3 and FIG. 4. FIG. 3 is a first schematic view of a circuit board of the LED lighting device in accordance with one embodiment of the present invention. FIG. 4 is a second schematic view of the circuit board of the LED lighting device in accordance with one embodiment of the present invention. As shown in FIG. 3, the circuit board 12 has a protective layer 121. The protective layer 121 includes an opening 1211 and two coated layers 1212. The coated layers 1212 may be ink layers capable of providing the insulating function and protecting the circuit board 12. The material of the coated layers 1212 is known by those skilled in the art, so will not be described herein.

As shown in FIG. 4, the opening 1211 includes a front section FS, a rear section RS and a connecting section CS. In this embodiment, the shape of the connecting section CS is a straight line. The front section FS is connected to the rear section RS via the connecting section CS, such that the opening 1211 can be H-shaped. The coated layers 1212 are disposed on the two sides of the connecting section CS respectively.

The embodiment just exemplifies the present invention and is not intended to limit the scope of the present invention; any equivalent modification and variation according to the spirit of the present invention is to be also included within the scope of the following claims and their equivalents.

Figure 5A:
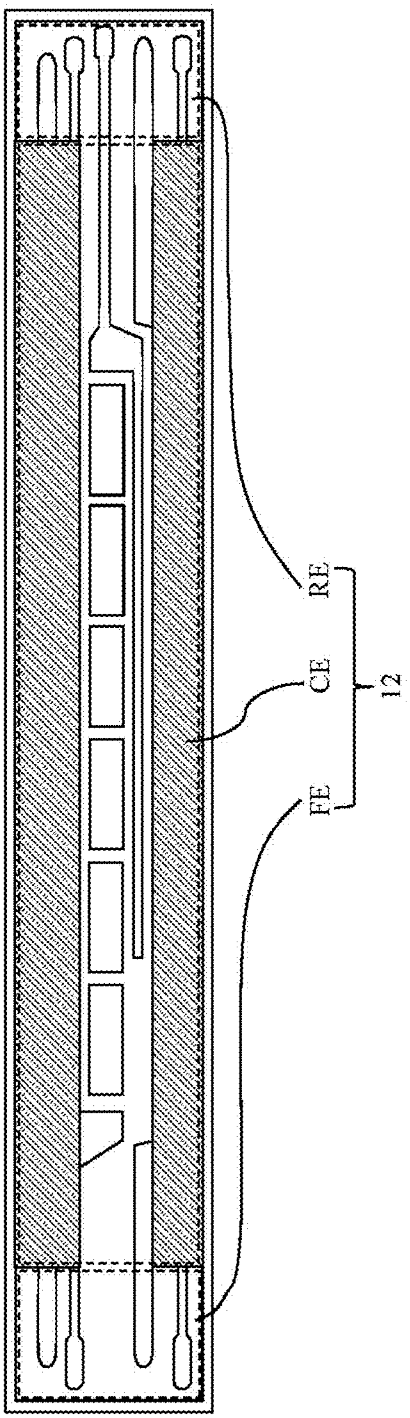
FIG. 5A is a third schematic view of the circuit board of the LED lighting device in accordance with one embodiment of the present invention.

Please refer to FIG. 5A, which is a third schematic view of the circuit board of the LED lighting device in accordance with one embodiment of the present invention. As shown in FIG. 5A, the circuit board 12 has a front soldering section FE, a rear soldering section RE and a circuit section CE. The front soldering section FE is electrically connected to the rear soldering section RE via the circuit section CE. The light sources LD are disposed on the circuit section CE and electrically connected to the circuit section CE. Any one of the coated layers 1212 of the protective layer 121 is separated from the front soldering section FE by a predetermined distance (in one embodiment, the predetermined distance may be greater than 4 m). Similarly, any one of the coated layers 1212 of the protective layer 121 is separated from the rear soldering section RE by the predetermined distance. The aforementioned predetermined distance can avoid that the halogen elements of the protective layer 121 move to the front soldering section FE and the rear soldering section RE of the circuit board 12.

The front soldering section FE has several connecting points, which may include a positive electrode, a negative electrode, a grounding point, etc. The rear soldering section RE also has the same structure. The circuit section CE has a plurality of traces. The light sources LD are disposed on the circuit board 12 and within the connecting section CE so as to electrically connect to the trances, such that the light sources LD can be electrically connected to the front soldering section FE and the rear soldering section RE via these traces.

As previously stated, the protective layer 121 of the circuit board 12 of the lighting device I have only one opening 1211. Therefore, the coating process of the protective layer 121 can be significantly simplified, such that the manufacturing cost of the LED lighting device 1 can be greatly reduced.

Besides, the above structural design can avoid that the halogen elements of the protective layer 121 move to the front soldering section FE and the rear soldering section RE of the circuit board 12. As a result, the front soldering section FE and the rear soldering section RE of the circuit board 12 will not be oxidized, which can make sure that the front soldering section FE and the rear soldering section RE of the circuit board 12 can achieve great conductivity and soldering effect during the manufacturing process.

In addition, the circuit board 12 of the LED lighting device 1 may further include a multi-function layer (not shown in the drawings). The multi-function layer can cover the opening 1211 of the protective layer 121 and the light sources LD disposed on the circuit board 12. The multi-function layer may be a transparent ink layer and can provide one or more of antioxidant function, insulating function, light reflecting function, moisture-proof function, etc. The material of the multi-function layer is known by those skilled in the art, so will not be described herein. Therefore, the LED lighting device I can have high reliability with a view to improving the overall quality thereof.

The embodiment just exemplifies the present invention and is not intended to limit the scope of the present invention; any equivalent modification and variation according to the spirit of the present invention is to be also included within the scope of the following claims and their equivalents.

Figure 5B:
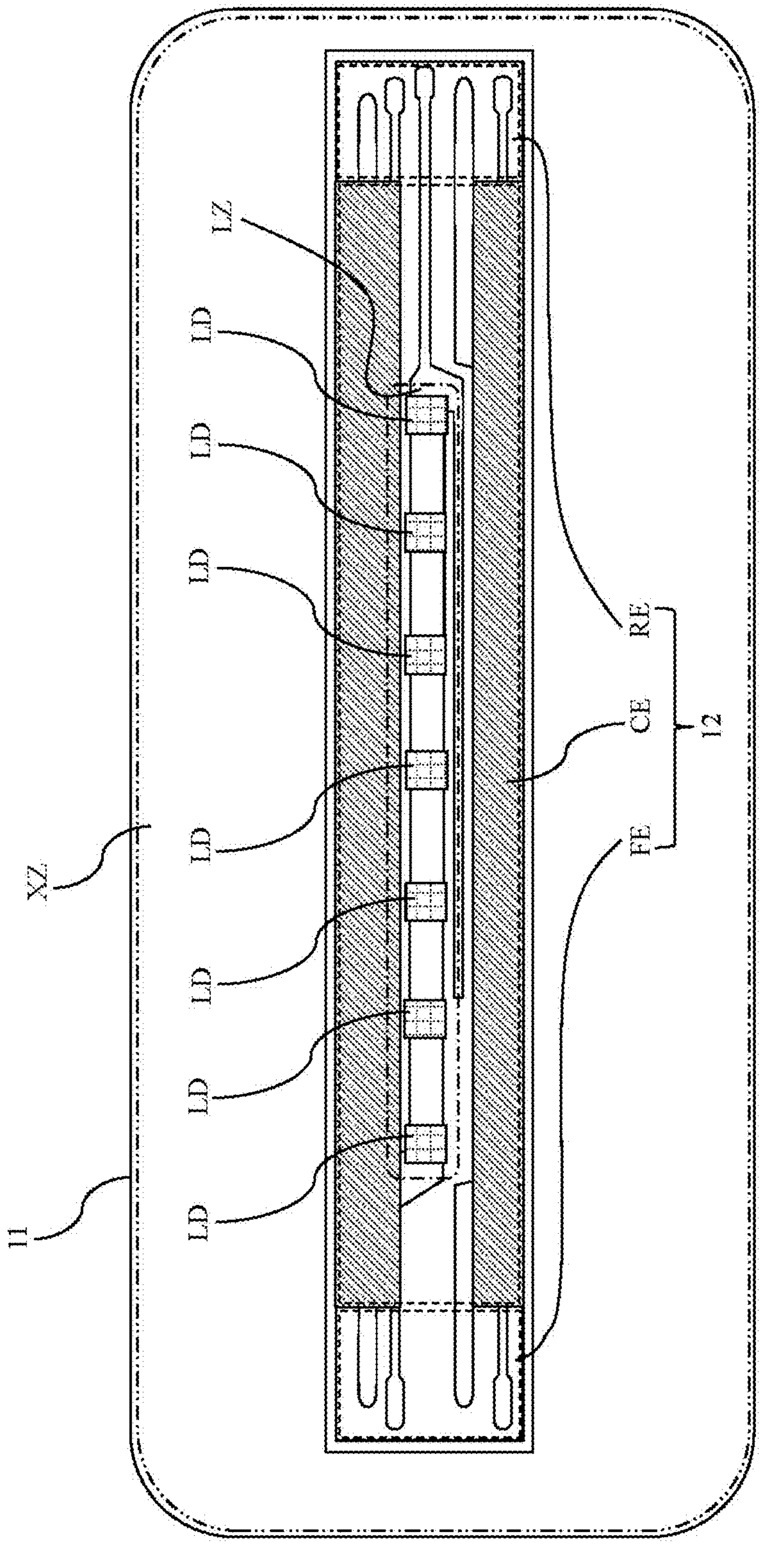
FIG. 5B is a fourth schematic view of the circuit board of the LED lighting device in accordance with one embodiment of the present invention.

Please refer to FIG. 5B, which is a fourth schematic view of the circuit board of the LED lighting device in accordance with one embodiment of the present invention. As shown in FIG. 5B, the circuit board 12 disposed in the light cover 11. the light sources LD are disposed within the connecting section CE, so a light-emitting zone LZ is formed (the light-emitting zone LZ is shown in FIG. 5B by one-point chain line; the light-emitting zone LZ stands for the zone which can emit light).

The light-emitting zone LZ can emit light, and the light can spread over the inner space of the light cover 11 to make the inner space of the light cover 11 form an optical zone XZ (the optical zone XZ is shown in FIG. 5B by two-point chain line; the optical zone XZ stands for the zone inside the light cover 11 filled with light). The optical section XZ simultaneously covers the light-emitting section LZ, the front soldering section FE and the rear soldering section RE.

Via the above optical structure design, the optical zone XZ of the light cover 11 can be further extended to cover the front soldering section FE and the rear soldering section RE of the circuit board 12 (the power supplier 14 is still outside the optical zone XZ), which can further expand the optical zone XZ of the light cover 11. Thus, the overall light-emitting area of the LED lighting device 1 can be significantly increased, so the light efficiency of the LED lighting device 1 can be enhanced.

The embodiment just exemplifies the present invention and is not intended to limit the scope of the present invention; any equivalent modification and variation according to the spirit of the present invention is to be also included within the scope of the following claims and their equivalents.

Figure 6:
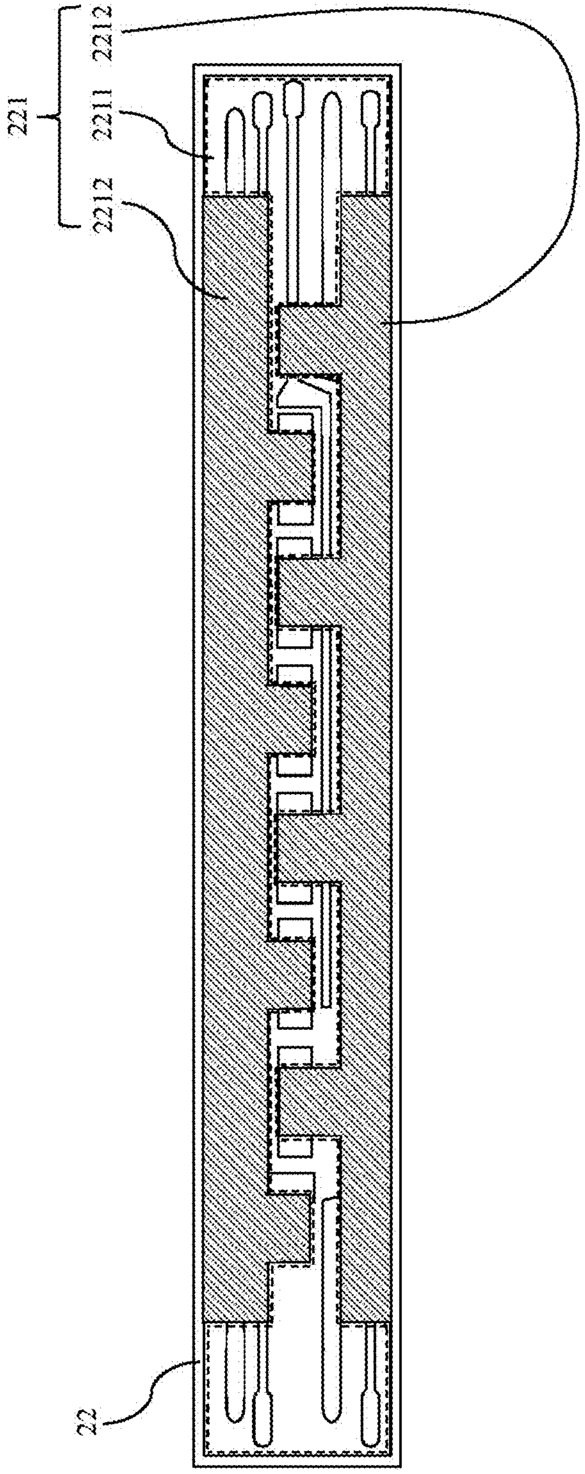
FIG. 6 is a first schematic view of a circuit board of the LED lighting device in accordance with another embodiment of the present invention.
Figure 7:
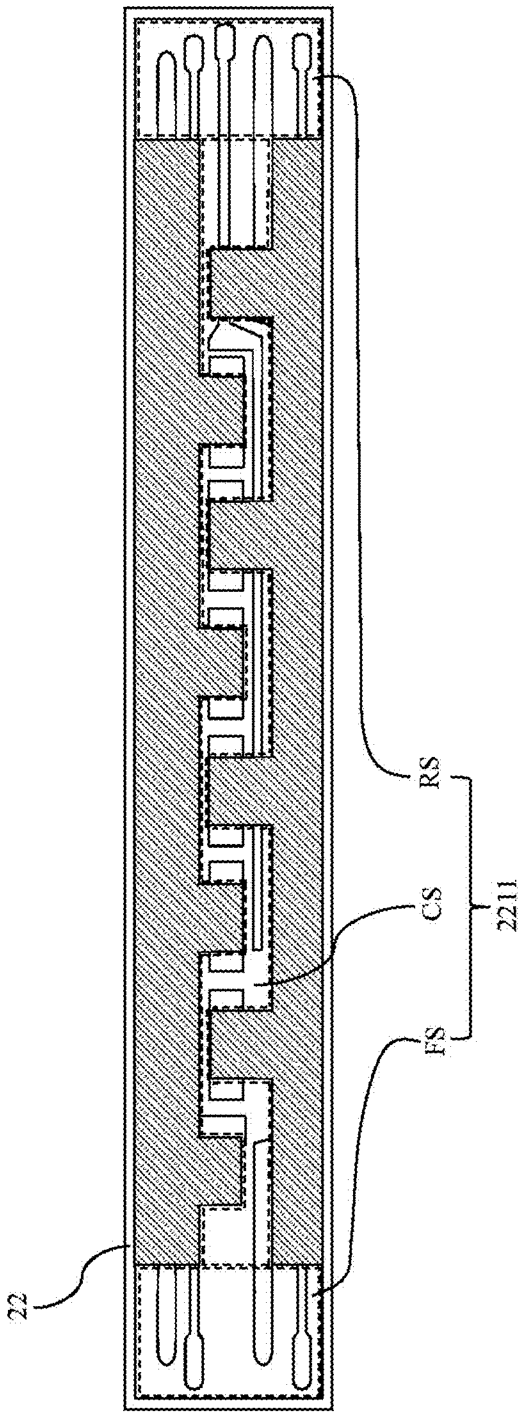
FIG. 7 is a second schematic view of the circuit board of the LED lighting device in accordance with another embodiment of the present invention.
Figure 8:
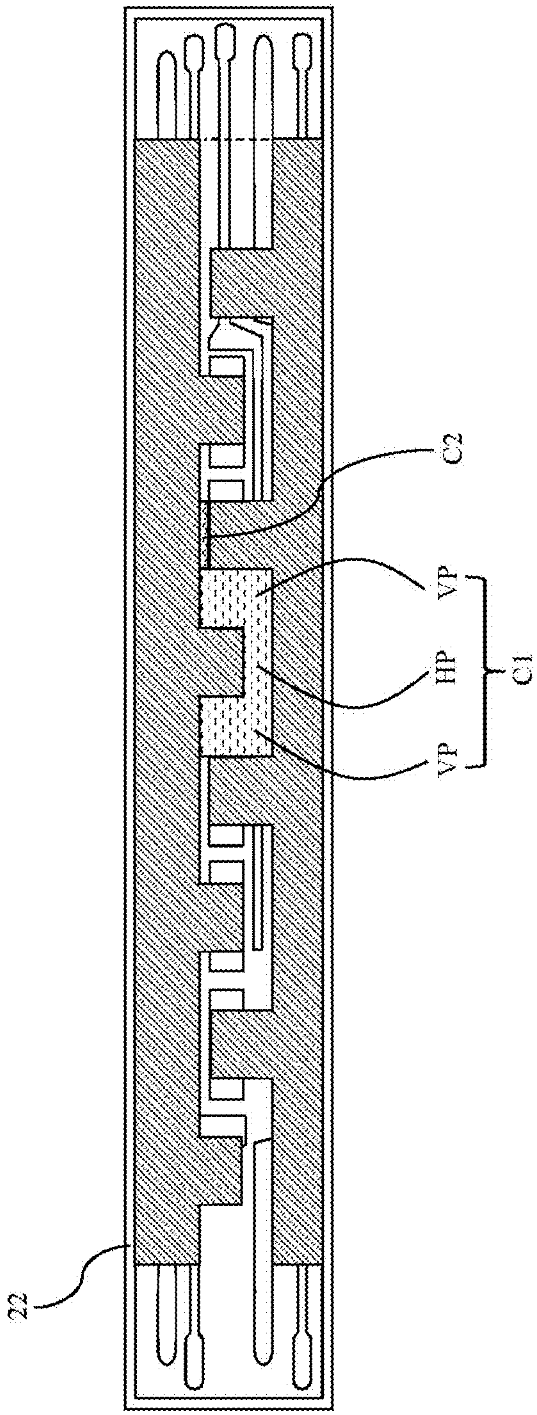
FIG. 8 is a third schematic view of the circuit board of the LED lighting device in accordance with another embodiment of the present invention.

Please refer to FIG. 6, FIG. 7 and FIG. 8. FIG. 6 is a first schematic view of a circuit board of the LED lighting device in accordance with another embodiment of the present invention. FIG. 7 is a second schematic view of the circuit board of the LED lighting device in accordance with another embodiment of the present invention. FIG. 8 is a third schematic view of the circuit board of the LED lighting device in accordance with another embodiment of the present invention. As shown in FIG. 6, the circuit board 22 has a protective layer 221. The protective layer 221 includes an opening 2211 and two coated layers 2212. Similarly, the coated layers 2212 may be ink layers capable of providing the insulating function and protecting the circuit board 22.

As shown in FIG. 7, the opening 2211 includes a front section FS, a rear section RS and a connecting section CS. The front section FS is connected to the rear section RS via the connecting section CS. The coated layers 2212 are disposed on the two sides of the connecting section CS respectively.

As shown in FIG. 8, the difference between this embodiment and the previous embodiment is that the connecting section CS of the opening 2211 includes a plurality of bending portions C1 and a plurality of connecting portions C2 connected to each other and arranged in an alternating order. Any one of the bending portions C1 is connected to the bending portion C1 adjacent thereto via one of the connecting portions C2.

In this embodiment, each of the bending portions C1 includes two vertical portions VP and a horizontal portion HP connected to each other and perpendicular to each other, such that the shape of the bending portion C1 is U-shaped. In another embodiment, the shape of the bending portion C1 may be inverted U-shaped. In still another embodiment, each of the bending portions C1 may have only one vertical portions VP and one horizontal portion HP connected to each other and perpendicular to each other. The structure of the bending portion C1 can be changed according to actual requirements.

Besides, the width of the horizontal portion HP is greater than the width of the connecting portion C2. In another embodiment, the width of the horizontal portion HP may be equal to or less than the width of the connecting portion C2. Therefore, in this embodiment, the shape of the connecting section CS is a rectangular wave. In another embodiment, the shape of the connecting section CS may be a sinusoidal wave. Of course, the shape of the connecting section CS can be changed according to actual requirements.

The embodiment just exemplifies the present invention and is not intended to limit the scope of the present invention; any equivalent modification and variation according to the spirit of the present invention is to be also included within the scope of the following claims and their equivalents.

Figure 9:
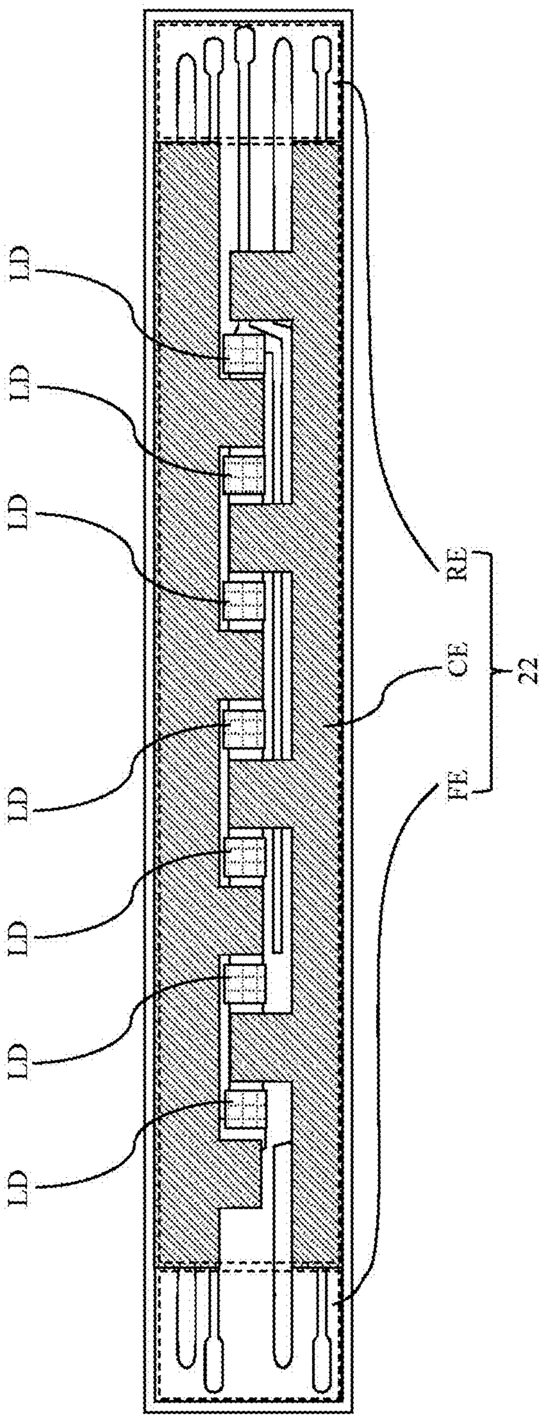
FIG. 9 is a fourth schematic view of the circuit board of the LED lighting device in accordance with another embodiment of the present invention.

Please refer to FIG. 9, which is a fourth schematic view of the circuit board of the LED lighting device in accordance with one embodiment of the present invention. As shown in FIG. 9, the circuit board 22 has a front soldering section FE, a rear soldering section RE and a circuit section CE. The front soldering section FE is electrically connected to the rear soldering section RE via the circuit section CE. The light sources LD are disposed on the circuit section CE (and within the connecting section CE) and electrically connected to the circuit section CE. Any one of the coated layers 2212 of the protective layer 221 is separated from the front soldering section FE by a predetermined distance (as set forth above, the predetermined distance may be greater than 4 m). Similarly, any one of the coated layers 2212 of the protective layer 221 is separated from the rear soldering section RE by the predetermined distance. The structure of the circuit board 22 is the same with that of the circuit board 22 of the previous embodiment, so will not be described herein again.

As previously stated, the protective layer 221 of the circuit board 22 have only one opening 2211. Therefore, the coating process of the protective layer 221 can be significantly simplified, such that the manufacturing cost of the LED lighting device can be greatly reduced.

Moreover, since the shape of the opening 2211 of the protective layer 221 is a rectangular wave (serrated), each of the coated layers 2212 has several protrusions, so the area of the protective layer 221 can increase. Accordingly, the protective layer 221 can cover more of the area of the surface of the circuit board 22 so as to more effectively protect the circuit board 22.

Similarly, the above structural design can avoid that the halogen elements of the protective layer 221 move to the front soldering section FE and the rear soldering section RE of the circuit board 22. As a result, the front soldering section FE and the rear soldering section RE of the circuit board 22 will not be oxidized, which can make sure that the front soldering section FE and the rear soldering section RE of the circuit board 22 can achieve great conductivity and soldering effect during the manufacturing process. The circuit board 22 may also include a multi-function layer (not shown in the drawings).

The embodiment just exemplifies the present invention and is not intended to limit the scope of the present invention; any equivalent modification and variation according to the spirit of the present invention is to be also included within the scope of the following claims and their equivalents.

Figure 11:
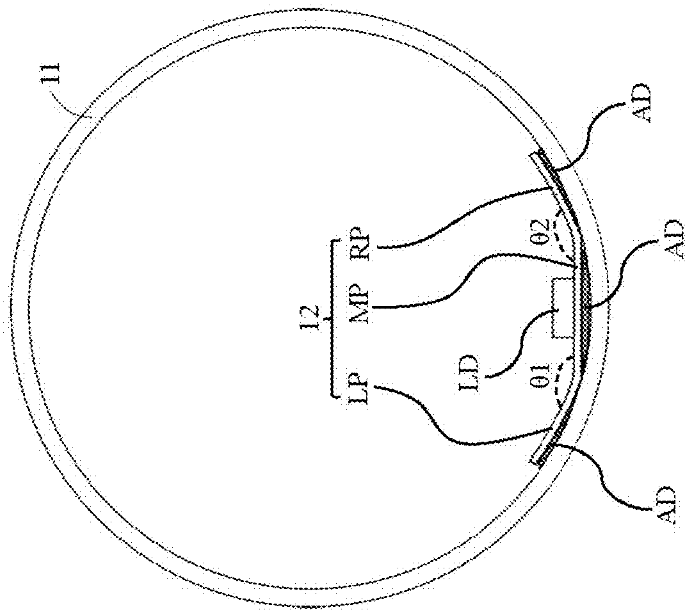
FIG. 11 is a sectional view of the LED lighting device in accordance with yet another embodiment of the present invention.
Figure 10:
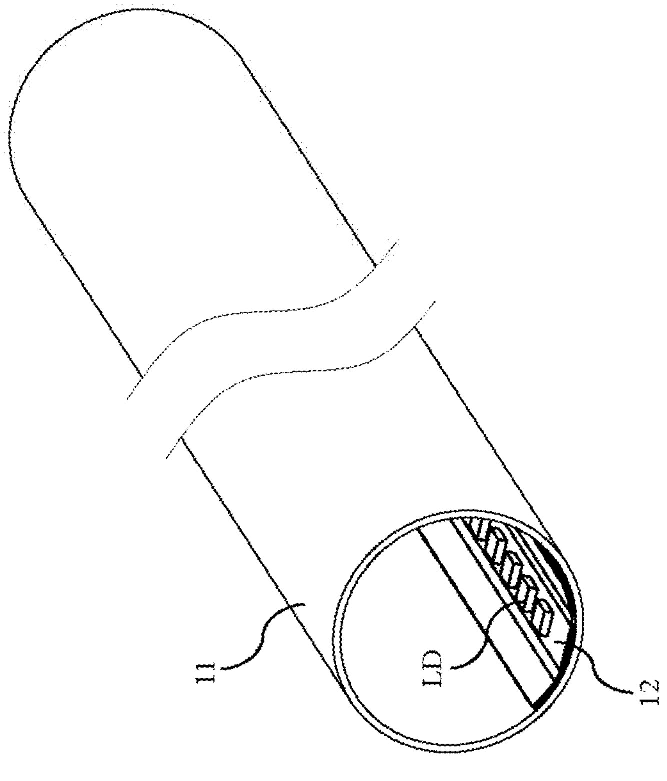
FIG. 10 is an enlargement view of a light cover of a LED lighting device in accordance with yet another embodiment of the present invention.

Please refer to FIG. 10 and FIG. 11. FIG. 10 is an enlargement view of a light cover of a LED lighting device in accordance with yet another embodiment of the present invention. FIG. 11 is a sectional view of the LED lighting device in accordance with yet another embodiment of the present invention. As shown in FIG. 10 and FIG. 11, the difference between this embodiment and the previous embodiments is that the circuit board 12 of this embodiment is bent. The circuit board 12 may be a flexible printed circuit board (FPCB).

The circuit board 12 includes a left-wing portion LP, a right-wing portion RP, and a flat portion MP. The left-wing portion LP, right-wing portion RP, and flat portion MP are flat (planar in shape). The left-wing portion LP and the right-wing portion RP respectively extend from both sides of the flat portion MP, such that the flat portion MP is located between the left-wing portion LP and right-wing portion RP. The left-wing portion LP and the right-wing portion RP are not parallel to the flat portion MP. Thus, the circuit board 12 may be bent. In another embodiment, the left-wing portion LP and the right-wing portion RP may also be bent.

An included angle θ1 is formed between the left-wing portion LP and the flat portion MP, and the included angle θ1 is greater than 90°. An included angle θ2 is formed between the right-wing portion RP and the flat portion MP, and the included angle θ2 is also greater than 90°. For example, the included angles θ1 and θ2 may be 150°. In other examples, the included angles θ1 and θ2 may be 160°, or even 165°. The included angles θ1 and θ2 may vary according to actual requirements, so that the circuit board 12 can conform as closely as possible to the inner surface of the light cover 11. The circuit board 12 may be adhered to the inner surface of the light cover 11 via an adhesive material AD. During the process of adhering the circuit board 12 to the inner surface of the light cover 11 with the adhesive material AD, the adhesive material AD is flattened and forms a uniform protective layer. In one embodiment, the adhesive material AD may be silicone adhesive, epoxy resin, thermally conductive silicone, or other currently available adhesive compounds.

If the circuit board 12 is planar, it would experience significant stress when fixed to the inner surface of the light cover 11, possibly leading to damage due to stress. In contrast, in this embodiment, since the circuit board 12 is bent, the stress exerted on the circuit board 12 can be greatly reduced. In addition, the protective layer formed by the adhesive material AD can further disperse stress, thereby further reducing the stress applied to the circuit board 12. As such, the service life of the LED lighting device 1 can be significantly extended, meeting actual requirements.

The embodiment just exemplifies the present invention and is not intended to limit the scope of the present invention; any equivalent modification and variation according to the spirit of the present invention is to be also included within the scope of the following claims and their equivalents.

Figure 12:
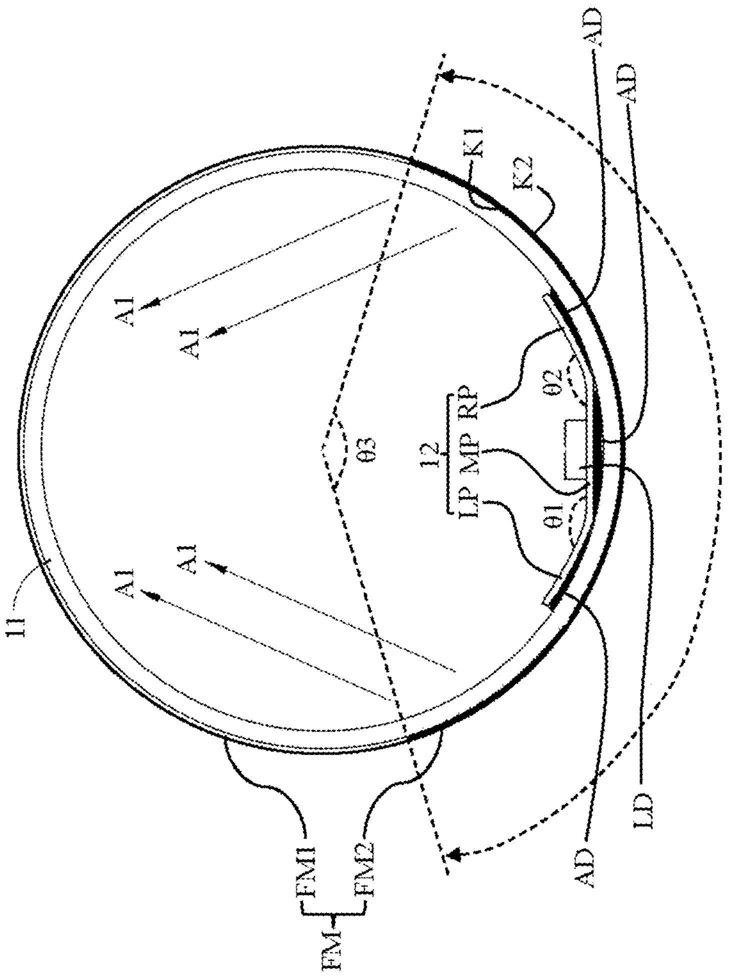
FIG. 12 is a sectional view of a LED lighting device in accordance with still another embodiment of the present invention.

Please refer to FIG. 12, which is a sectional view of a LED lighting device in accordance with still another embodiment of the present invention. As shown in FIG. 12, the difference between this embodiment and the previous embodiments is that the surface of the light cover 11 is enclosed by an optical film FM. The optical film FM includes a transparent portion FM1 and a non-transparent portion FM2. In one embodiment, the optical film FM may be made from polymer materials of at least two different colors, such as PET, OPP, or other similar materials.

The distance between the non-transparent portion FM2 and the circuit board 12 is less than the distance between the transparent portion FM1 and the circuit board 12. As can be seen in the figure, the non-transparent portion FM2 is located closer to the circuit board 12; therefore, the transparent portion FM1 faces the light source LD. The area of the non-transparent portion FM2 is greater than or at least equal to the area of the circuit board 12, allowing the non-transparent portion FM2 to conceal the adhesive material AD. The central angle θ3 corresponding to the arc formed by the cross-section of the optical film FM may range from 30° to 180°. For example, the central angle may be 35°, 60°, 100°, 130°, or 170°. The central angle may vary depending on actual requirements to meet different application needs.

In addition, the inner surface of the non-transparent portion FM2 serves as a reflective surface K1, while the outer surface of the non-transparent portion FM2 functions as a light-shielding surface K2. The light-blocking surface K2 can effectively block light. Most of the light emitted by the light source LD passes directly through the transparent portion FM1, while a portion of the light is reflected by the reflective surface K1 and also passes through the transparent portion FM1. In this way, the light efficacy of the LED lighting device 1 can be further improved, thereby enhancing the overall performance of the LED lighting device 1.

With the dual-color optical film design described above, traces of the adhesive material AD can be shielded by the non-transparent portion FM2 of the optical film FM, thereby improving the appearance of the LED lighting device 1 and effectively enhancing the user experience. In addition, light emitted from the light sources LD can still pass through the transparent portion FM1 of the optical film FM to provide lighting function.

On the other hand, the outer surface of the optical film FM can also include various patterns or text, which can further enhance the appearance of the LED lighting device 1 and increase the perceived quality thereof, thereby meeting the preferences of different users.

Further, since the optical film FM includes the transparent portion FM1 and non-transparent portion FM2, the user can easily identify the non-transparent portion FM2 during installation of the LED lighting device 1, allowing the user to quickly locate the transparent portion FM1 (which serves as the light-emitting surface). Therefore, with the dual-color optical film design, the user can install the LED lighting device 1 more conveniently.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the LED lighting device includes a power supplier, a light cover and a circuit board. The circuit board is disposed in the light cover and adhered to the inner surface of the light cover via an adhesive material. The circuit board has a protective layer disposed thereon and a plurality of light sources. The circuit board has a front soldering section, a rear soldering section and a circuit section. The front soldering section is electrically connected to the rear soldering section via the circuit section, and the front soldering section and the rear soldering section are electrically connected to the power supplier. The light sources are disposed on the circuit section and electrically connected to the circuit section. The circuit board includes a left-wing portion, a right-wing portion, and a flat portion disposed therebetween. The left-wing portion and the right-wing portion respectively extend from the two sides of the flat portion, and are not parallel to the flat portion, such that the circuit board is bent. The protective layer includes an opening and two coated layers. The opening includes a front section, a rear section and a connecting section. The front section is connected to the rear section via the connecting section, and the coated layers are disposed on the two sides of the connecting section respectively. The light sources are within the connecting section to serve as a light-emitting zone. The light-emitting zone makes the inner space of the light cover form an optical zone, such that the optical zone simultaneously covers the light-emitting zone, the front soldering section and the rear soldering section. Via the above-mentioned circuit board structural design, the stress applied to the circuit board adhered to the inner surface of the light cover can be significantly reduced, thereby preventing damage to the circuit board caused by stress. As a result, the service life of the LED lighting device can be greatly extended to meet actual requirements.

Also, according to one embodiment of the present invention, the surface of the light cover is enclosed by an optical film, and the optical film includes a transparent portion and a non-transparent portion. The non-transparent portion is adjacent to the circuit board, such that the adhesive material is covered by the non-transparent portion. With the dual-color optical film design described above, traces of the adhesive material can be shielded by the non-transparent portion of the optical film, thereby improving the appearance of the LED lighting device and effectively enhancing the user experience. In addition, light emitted from the light sources can still pass through the transparent portion of the optical film to provide lighting function.

Further, according to one embodiment of the present invention, the non-transparent portion has a reflective surface contacting the light cover and a light-shielding surface not contacting the light cover. Via the reflective surface of the optical film, a portion of the light emitted from the light sources can be reflected by the reflective surface and passes through the transparent portion of the optical film. In this way, the light efficacy of the LED lighting device can be further improved, thereby enhancing the overall performance of the LED lighting device. Thus, the practicality of the LED lighting device can be improved to meet various application requirements.

Moreover, according to one embodiment of the present invention, since the optical film includes the transparent portion and non-transparent portion, the user can easily identify the non-transparent portion during installation of the LED lighting device, allowing the user to quickly locate the transparent portion (which serves as the light-emitting surface). Therefore, with the dual-color optical film design, the user can install the LED lighting device more conveniently.

Moreover, according to one embodiment of the present invention, the outer surface of the optical film can also include various patterns or text, which can further enhance the appearance of the LED lighting device and increase the perceived quality thereof, thereby meeting the preferences of different users.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting diode (LED) lighting device, comprising:

a power supplier;

a light cover; and a circuit board disposed in the light cover, and having a protective layer disposed thereon and a plurality of light sources, wherein the circuit board has a front soldering section, a rear soldering section and a circuit section, wherein the front soldering section is electrically connected to the rear soldering section via the circuit section, and the front soldering section and the rear soldering section are electrically connected to the power supplier, wherein the light sources are disposed on the circuit section and electrically connected to the circuit section, wherein the circuit board comprises a left-wing portion, a right-wing portion, and a flat portion disposed therebetween, the left-wing portion and the right-wing portion respectively extend from two sides of the flat portion, and are not parallel to the flat portion, whereby the circuit board is bent;

wherein the protective layer comprises an opening and two coated layers, and the opening comprises a front section, a rear section and a connecting section, wherein the front section is connected to the rear section via the connecting section, and the coated layers are disposed on two sides of the connecting section respectively, and the light sources are within the connecting section to serve as a light-emitting zone, wherein the light-emitting zone makes an inner space of the light cover forms an optical zone, whereby the optical zone simultaneously covers the light-emitting zone, the front soldering section and the rear soldering section.

2. The LED lighting device as claimed in claim 1, wherein an included angle between the left-wing portion and the circuit board is greater than 90°, and an included angle between the right-wing portion and the circuit board is greater than 90°.

3. The LED lighting device as claimed in claim 1, wherein the circuit board is adhered to an inner surface of the light cover via an adhesive material.

4. The LED lighting device as claimed in claim 3, wherein a surface of the light cover is enclosed by an optical film comprising a transparent portion and a non-transparent portion, and the non-transparent portion is adjacent to the circuit board, whereby the adhesive material is covered by the non-transparent portion.

5. The LED lighting device as claimed in claim 4, wherein the non-transparent portion has a reflective surface contacting the light cover and a light-shielding surface not contacting the light cover.

6. The LED lighting device as claimed in claim 1, wherein the circuit board is a flexible printed circuit board.

7. The LED lighting device as claimed in claim 1, wherein the front section is connected to the rear section via the connecting section, whereby the opening is H-shaped.

8. The LED lighting device as claimed in claim 1, wherein the light sources are LEDs or a LED light strip.

9. The LED lighting device as claimed in claim 1, further comprising two end caps, wherein the two end caps are disposed at two ends of the light cover and the power supplier is disposed in one of the end caps.

10. The LED lighting device as claimed in claim 1, wherein the connecting section comprises a plurality of bending portions and a plurality of connecting portions connected to each other.

11. The LED lighting device as claimed in claim 10, wherein the bending portions and the connecting portions are arranged in an alternating order.

12. The LED lighting device as claimed in claim 10, wherein a shape of the bending portion is U-shaped or inverted U-shaped.

13. The LED lighting device as claimed in claim 10, wherein each of the bending portions comprises at least one vertical portion and a horizontal portion connected to each other and perpendicular to each other.

14. The LED lighting device as claimed in claim 13, wherein a width of the horizontal portion is greater than a width of the connecting portion.

15. The LED lighting device as claimed in claim 1, wherein the light cover is made of a transparent material or a semi-transparent material.

* * * * *